US012748433B1

(12) United States Patent
Chen et al.

(10) Patent No.: US 12,748,433 B1
(45) Date of Patent: Sep. 29, 2026

(54) SYSTEMS AND METHODS OF OPERATING A SELF-DRIVING MATERIAL-TRANSPORT VEHICLE UNDER VARIOUS SAFETY MODES

(71) Applicant: ROCKWELL AUTOMATION CANADA LTD., Cambridge (CA)

(72) Inventors: Peiyi Chen, Waterloo (CA); Dennis Clyne, Cambridge (CA); Robert Dam, Kitchener (CA); Krispin Alexander Davies, Kitchener (CA); Ryan Christopher Gariepy, Waterloo (CA); Jeffrey Gorchynski, Kitchener (CA); Amer Keblawi, Kitchener (CA); Jordan Lloyd, Kitchener (CA); Nolan Lunscher, Kitchener (CA); Jason Mercer, Kitchener (CA); Devjit Naha, Burlington (CA); Michael-Anthony Tedesco, Toronto (CA)

(73) Assignee: ROCKWELL AUTOMATION CANADA LTD., Cambridge (CA)

( * ) Notice: Subject to any disclaimer, the term of this patent is extended or adjusted under 35 U.S.C. 154(b) by 0 days.

(21) Appl. No.: 19/095,362

(22) Filed: Mar. 31, 2025

(51) Int. Cl.

| | |
|---|---|
| ***G05D 1/00*** | (2024.01) |
| ***G05D 1/617*** | (2024.01) |
| ***G05D 1/667*** | (2024.01) |
| *G05D 105/20* | (2024.01) |
| *G05D 107/70* | (2024.01) |
| *G05D 109/10* | (2024.01) |

(52) U.S. Cl.
CPC ............. *G05D 1/617* (2024.01); *G05D 1/667* (2024.01); *G05D 2105/20* (2024.01); *G05D 2107/70* (2024.01); *G05D 2109/10* (2024.01)

(58) Field of Classification Search
CPC .... G05D 1/617; G05D 1/667; G05D 2107/70; G05D 2109/10; G05D 2105/20
USPC ........................................................... 701/23
See application file for complete search history.

(56) References Cited

U.S. PATENT DOCUMENTS

| | | | | |
|---|---|---|---|---|
| 2019/0161942 | A1* | 5/2019 | Hokkanen | G06F 3/011 |
| 2020/0300691 | A1* | 9/2020 | Bonthuis | G01G 19/62 |
| 2022/0073062 | A1* | 3/2022 | Gariepy | B60W 30/09 |

FOREIGN PATENT DOCUMENTS

| | | | |
|---|---|---|---|
| EP | 3771955 | B8 | 5/2022 |
| ES | 2923753 | T3 | 9/2022 |

* cited by examiner

*Primary Examiner* — Tiffany P Young

(57) ABSTRACT

Systems and methods of operating a self-driving material-transport vehicle under various safety modes is disclosed. Each of the safety modes is determined autonomously based at least on one or more payload characteristics. The method involves operating a processor to: initiate a mission involving a payload; receive an initial set of payload characteristics prior to engaging the payload; defining an initial safety mode based on the initial set of payload characteristics; monitor the payload to detect one or more characteristic variations from the initial set of payload characteristics; and in response to determining one or more characteristic variations, automatically adapting the initial safety mode into an active safety mode to align an operation of the self-driving vehicle with the payload. In the absence of a payload, the self-driving vehicle can enter a basic safety mode.

20 Claims, 11 Drawing Sheets

1150

1125

SYSTEMS AND METHODS OF OPERATING A SELF-DRIVING MATERIAL-TRANSPORT VEHICLE UNDER VARIOUS SAFETY MODES

FIELD

The described embodiments relate generally to systems and methods of operating a self-driving material-transport vehicle under various safety modes.

BACKGROUND

Self-driving material-transport vehicles are increasingly deployed across various environments, including industrial and commercial settings such as warehouses and manufacturing facilities. These self-driving material-transport vehicles are designed to navigate autonomously within their environment while performing tasks such as transporting goods, retrieving inventory, or assisting in assembly operations. A critical aspect of self-driving material-transport vehicle operation is adherence to safety requirements to ensure reliable and accident-free performance, particularly in environments where they interact with humans or other machinery.

To meet safety requirements, self-driving material-transport vehicles operate within defined safety parameters, which typically dictate factors such as speed limits, stopping distances, and obstacle avoidance behaviors. In many cases, these safety parameters are set conservatively to ensure the highest level of safety across all possible operating conditions. However, this conservative approach can lead to inefficiencies, as the strictest safety settings may not be necessary in all situations. For example, self-driving material-transport vehicles transporting lightweight payloads may not require the same braking distance or acceleration limits as those carrying heavier loads. Similarly, self-driving material-transport vehicles operating in controlled or low-risk environments may be able to navigate more efficiently without compromising safety.

Despite these variations in operational conditions, many self-driving material-transport vehicles are configured to function under a one-size-fits-all safety model, often defaulting to the safest possible settings. While this approach minimizes risk, it can reduce operational efficiency by unnecessarily limiting speed, responsiveness, and throughput. Additionally, current safety systems may not dynamically adjust to account for changes in payload, environment, or real-time risk factors, leading to suboptimal performance.

SUMMARY

The various embodiments described herein generally relate to systems and methods of operating a self-driving material-transport vehicle under various safety modes.

In accordance with an example embodiment, there is provided a method of operating a self-driving material-transport vehicle under a plurality of safety modes determined autonomously based at least on one or more payload characteristics. The method involves operating the self-driving material-transport vehicle to initiate a mission involving a payload; receiving an initial set of payload characteristics prior to engaging the payload by the self-driving material-transport vehicle; defining an initial safety mode based at least on the initial set of payload characteristics for initiating engagement with the payload; while engaged with the payload, monitoring the payload to detect one or more characteristic variations from the initial set of payload characteristics; in response to determining the one or more characteristic variations from the initial set of payload characteristics, automatically adapting the initial safety mode into an active safety mode defined based at least on the one or more characteristic variations to align an operation of the self-driving material-transport vehicle with the payload; and operating the self-driving material-transport vehicle to enter a basic safety mode upon detection of an absence of the payload from the self-driving material-transport vehicle.

In some embodiments, defining the initial safety mode based at least on the initial set of payload characteristics for initiating engagement with the payload includes entering the initial safety mode at the self-driving material-transport vehicle when approaching the payload for engagement.

In some embodiments, defining the initial safety mode based at least on the initial set of payload characteristics for initiating engagement with the payload includes determining, from a safety configuration database, a prior mission involving a prior payload associated with a set of prior payload characteristics substantially similar to the initial set of payload characteristics; and defining the initial safety mode based on a prior mission characteristics associated with the prior mission.

In some embodiments, defining the initial safety mode based at least on the initial set of payload characteristics for initiating engagement with the payload includes defining an initial operation configuration for the self-driving material-transport vehicle based on the initial set of payload characteristics and one or more mission characteristics of the mission, the initial operation configuration comprising vehicle dynamic limits appropriate for the payload based on the initial set of payload characteristics and an environment of the self-driving material-transport vehicle; and assigning the initial operation configuration to the self-driving material-transport vehicle while operating in the initial safety mode.

In some embodiments, in response to determining the one or more characteristic variations from the initial set of payload characteristics, automatically adapting the initial safety mode into the active safety mode includes generating an active operation configuration to account for the one or more characteristic variations such that vehicle dynamic limits under the active operation configuration are appropriate for actual payload characteristics detected when engaged with the payload; and assigning the active operation configuration to the self-driving material-transport vehicle during operation.

In some embodiments, the method further includes continuously monitoring the payload to detect the one or more characteristic variations while operating in the active safety mode.

In some embodiments, monitoring the payload to detect the one or more characteristic variations from the initial set of payload characteristics includes inducing movement at the payload for analyzing a load characteristic of the payload; and determining whether there are any characteristic variations from the analysis of the load characteristic.

In some embodiments, monitoring the payload to detect the one or more characteristic variations from the initial set of payload characteristics includes monitoring an operation response at the self-driving material-transport vehicle when engaged with the payload; and in response to detecting an unexpected operation response when the operation response varies from an expected behaviour under the initial safety mode, determining the one or more characteristics variations based on the unexpected operation response.

In some embodiments, receiving the initial set of payload characteristics prior to engaging the payload by the self-driving material-transport vehicle includes receiving sensor data associated with the payload; and analyzing the sensor data to generate the initial set of payload characteristics for the payload.

In some embodiments, operating the self-driving material-transport vehicle to enter the basic safety mode upon detection of the absence of the payload from the self-driving material-transport vehicle includes entering the basic safety mode upon completing the mission involving the payload.

In accordance with an example embodiment, there is provided a system of operating a self-driving material-transport vehicle under a plurality of safety modes determined autonomously based at least on one or more payload characteristics. The system includes a processor operable to: operate the self-driving material-transport vehicle to initiate a mission involving a payload; receive an initial set of payload characteristics prior to engaging the payload by the self-driving material-transport vehicle; define an initial safety mode based at least on the initial set of payload characteristics for initiating engagement with the payload; while engaged with the payload, monitor the payload to detect one or more characteristic variations from the initial set of payload characteristics; in response to determining the one or more characteristic variations from the initial set of payload characteristics, automatically adapt the initial safety mode into an active safety mode defined based at least on the one or more characteristic variations to align an operation of the self-driving material-transport vehicle with the payload; and operate the self-driving material-transport vehicle to enter a basic safety mode upon detection of an absence of the payload from the self-driving material-transport vehicle.

In some embodiments, the processor is operable to enter the initial safety mode at the self-driving material-transport vehicle when approaching the payload for engagement.

In some embodiments, the processor is operable to determine, from a safety configuration database, a prior mission involving a prior payload associated with a set of prior payload characteristics substantially similar to the initial set of payload characteristics; and define the initial safety mode based on a prior mission characteristics associated with the prior mission.

In some embodiments, the processor is operable to define an initial operation configuration for the self-driving material-transport vehicle based on the initial set of payload characteristics and one or more mission characteristics of the mission, the initial operation configuration comprising vehicle dynamic limits appropriate for the payload based on the initial set of payload characteristics and an environment of the self-driving material-transport vehicle; and assign the initial operation configuration to the self-driving material-transport vehicle while operating in the initial safety mode.

In some embodiments, the processor is operable to generate an active operation configuration to account for the one or more characteristic variations such that vehicle dynamic limits under the active operation configuration are appropriate for actual payload characteristics detected when engaged with the payload; and assign the active operation configuration to the self-driving material-transport vehicle during operation.

In some embodiments, the processor is operable to continuously monitor the payload to detect the one or more characteristic variations while operating in the active safety mode.

In some embodiments, the processor is operable to induce movement at the payload for analyzing a load characteristic of the payload; and determine whether there are any characteristic variations from the analysis of the load characteristic.

In some embodiments, the processor is operable to monitor an operation response at the self-driving material-transport vehicle when engaged with the payload; and in response to detecting an unexpected operation response when the operation response varies from an expected behaviour under the initial safety mode, determine the one or more characteristics variations based on the unexpected operation response.

In some embodiments, the processor is operable to receive sensor data associated with the payload; and analyze the sensor data to generate the initial set of payload characteristics for the payload.

In some embodiments, the processor is operable to enter the basic safety mode upon completing the mission involving the payload.

BRIEF DESCRIPTION OF THE DRAWINGS

Several embodiments will now be described in detail with reference to the drawings, in which:

FIG. 90 is a diagram of an example sensor region for an example self-driving material-transport vehicle carrying a small light-weight payload when turning;

Figure 1:
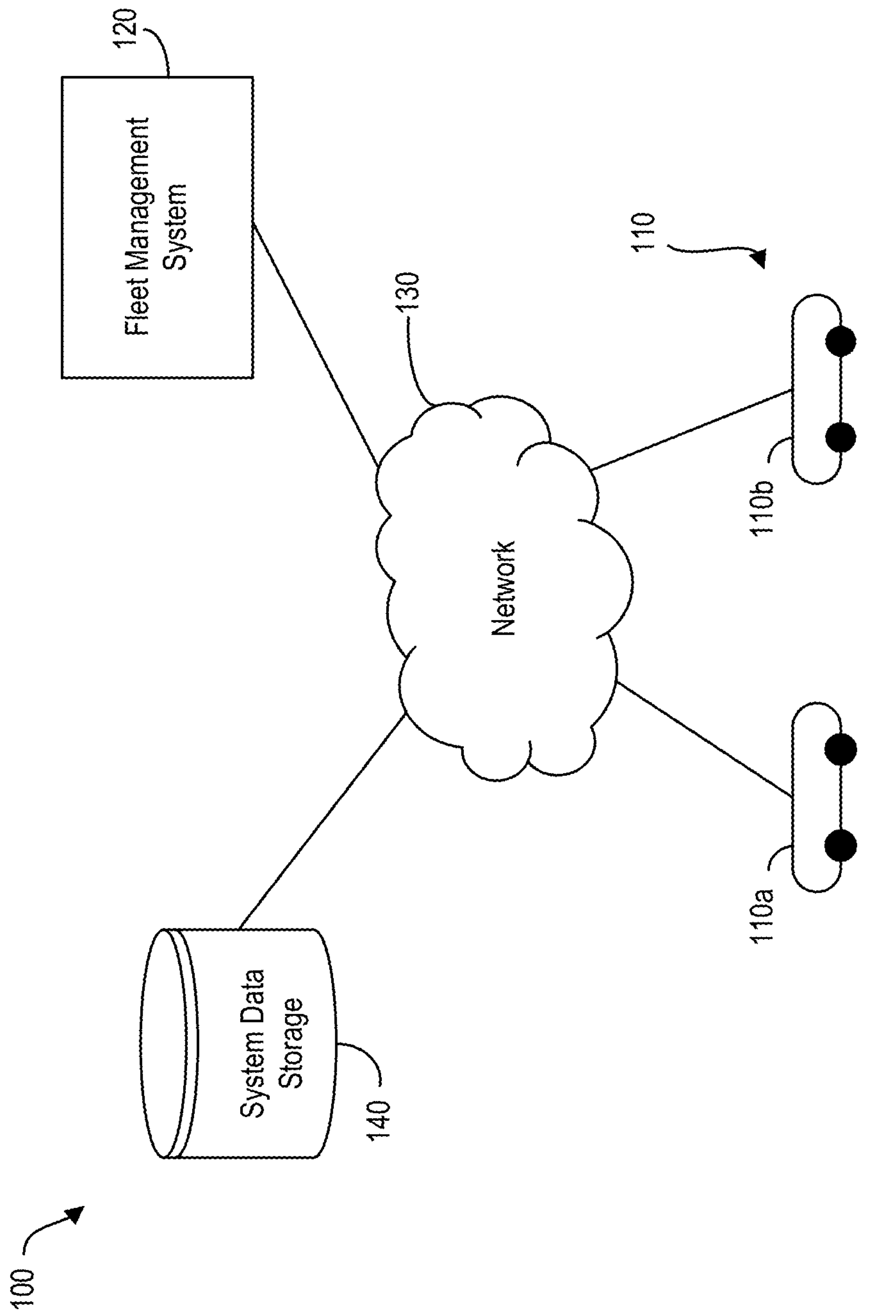
FIG. 1 is a block diagram illustrating an example self-driving material-transport vehicle in communication with example components, according to an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Self-driving material-transport vehicles, or self-driving vehicles, are increasingly deployed across various industries, including manufacturing, warehousing, and healthcare, to enhance operational efficiency. These vehicles must navigate complex, dynamic environments while adhering to strict safety standards to prevent collisions, equipment malfunctions, or workflow disruptions. A critical challenge in self-driving vehicle operation is the variability in payload characteristics. Not all payloads behave the same way—differences in weight, angular inertia, size, center of gravity, and dynamic properties can significantly impact the vehicle's movement, stability, acceleration, and stopping distances. Failing to account for these factors can result in inefficient navigation, increased wear on vehicle components, and heightened safety risks.

Traditional self-driving vehicle systems rely on predefined motion parameters that assume fixed or generic payload characteristics. These static configurations fail to account for real-time variations in payload weight distribution, inertia, and other physical properties. As a result, such systems often either impose overly cautious constraints—unnecessarily reducing speed and efficiency—or operate beyond safe limits, increasing the likelihood of accidents or system failures. To achieve both safety and efficiency, it is essential for self-driving vehicles to dynamically adapt their performance based on the payload they are transporting. By continuously assessing payload characteristics in real time, these vehicles can make data-driven adjustments to navigation speed, acceleration rates, braking force, and maneuvering strategies. This enables optimal performance without compromising safety.

Previous systems were constrained by the static nature of their kinematic and dynamic models, which relied on fixed parameters and lacked the adaptability to account for varying payloads, rather than by the simplicity of the models themselves. As a result, these vehicles were often restricted to slower speeds, gradual acceleration, reduced turning rates and wider safety fields, which required more free space. While such constraints prioritized safety, they also led to inefficient operations, particularly in high-throughput environments where space is limited and maximizing transport efficiency is critical. For large-scale deployments, such inefficiencies can compound, affecting overall fleet performance and limiting the scalability of automated transport solutions.

Prior safety systems further restricted vehicle operation by enforcing highly discretized safety states. These rigid frameworks lacked the flexibility to adjust safety controls based on changing environmental conditions, payload attributes, or operational contexts. For instance, some systems applied the same safety margins regardless of whether the vehicle was operating with a heavy payload or with a light payload, leading to unnecessary slowdowns in scenarios where higher speeds would be safe. This lack of adaptability often resulted in unnecessary operational bottlenecks, limiting the overall effectiveness of self-driving vehicle deployments. A more intelligent safety framework—capable of dynamically adjusting safety parameters based on real-time data—would allow for more efficient and context-aware navigation.

By integrating real-time payload assessment with adaptive performance adjustments, self-driving vehicles can optimize key operational parameters, including navigation speed, acceleration, braking, and obstacle avoidance. This approach enables autonomous vehicles to operate at peak efficiency while remaining fully compliant with safety regulations. In practice, such a system enhances throughput, reduces unnecessary slowdowns, and minimizes the risk of accidents caused by improperly calibrated movement parameters. Adaptive control strategies allow self-driving vehicles to function more intelligently, responding dynamically to payload variations and environmental conditions, ultimately improving both safety and productivity in automated transport operations.

A self-driving material-transport vehicle can include various sensors for sensing its environment. The various sensors can be used to facilitate autonomous navigation within the self-driving material-transport vehicle's environment with minimal to no human input. For example, a self-driving material-transport vehicle may use optical, RADAR, LIDAR, SONAR, GPS, odometry, or inertial measurement sensors, to perceive its surroundings and interact with payloads. The sensor data can then be interpreted by the self-driving material-transport vehicle and/or a fleet management system to identify payloads and determine appropriate operation. Additionally, sensor data obtained from other self-driving vehicles can be shared with other self-driving vehicles operating in the same environment or with the same kind of payload to provide additional data to aid in assessing payload characteristics and overall self-driving vehicle performance. The various sensors employed by a self-driving material-transport vehicle can produce large volumes of sensor data. The data generated by or collected by a self-driving material-transport vehicle can be used to determine the payload being transported and/or align an operation of the self-driving vehicle in accordance with the detected payload.

The embodiments described herein provide systems and methods of operating a self-driving material-transport vehicle under various safety modes determined autonomously based at least on one or more payload characteristics. The payload can be monitored to determine operational performance of the self-driving vehicle and ensure the vehicle is operating at peak efficiency in accordance with required safety configurations and the payload being transported.

Reference is now made to FIG. 1, which shows a block diagram 100 illustrating example self-driving vehicles 110*a*, 110*b* (collectively referred to as the self-driving vehicles 110) in communication with a system data storage 140, and a fleet management system 120, via a network 130. While FIG. 1 shows example self-driving vehicles 110*a*, 110*b* for illustrative purposes, fewer or more self-driving vehicles 110 can operate with the fleet management system 120.

The network 130 may be any network capable of carrying data, including the Internet, Ethernet, old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, Bluetooth mesh, fixed line, local area network, wide area network, and others, including any combination of these, capable of interfacing with, and enabling communication between the self-driving material-transport vehicles 110, the fleet management system 120 and/or the system data storage 140. In some embodiments, the self-driving vehicles 110 can communicate with each other via the network 130. For example, self-driving vehicle 110*a* can communicate with self-driving vehicle 110*b* via the network 130. In some embodiments, self-driving vehicle 110*a* can communicate with self-driving vehicle 110*b* directly via onboard communication components.

The system data storage 140 can store data related to the self-driving material-transport vehicles 110 and/or the fleet management system 120. The system data storage 140 can include RAM, ROM, one or more hard drives, one or more flash drives or some other suitable data storage elements such as disk drives, etc.

The system data storage 140 may also store a safety configuration database. The safety configuration database can store payload information mapped to various types of payloads the self-driving material-transport vehicles 110 may engage with or have previously engaged with. The safety configuration database can also store prior mission data which can include prior payload characteristics, prior mission characteristics, and the associated safety modes, for example. The safety configuration database located on system data storage 140 can be accessible for download, via the network 130, by the fleet management system 120 and the self-driving material-transport vehicles 110. In some embodiments, the safety configuration database can be generated and updated by the fleet management system 120 based on information received from the self-driving material-transport vehicles 110. In some embodiments, the system data storage 140 can be located at the fleet management system 120.

The illustrated FIG. 1 includes the fleet management system 120. The fleet management system 120 can operate to direct and/or monitor the operation of the self-driving material-transport vehicles 110. In some embodiments, the self-driving material-transport vehicles 110 can operate within a decentralized network-without, or at least with minimal, involvement of the fleet management system 120.

The fleet management system 120 can include a processor, a data storage, and a communication component (not shown). For example, the fleet management system 120 can be any computing device, such as, but not limited to, an electronic tablet device, a personal computer, workstation, server, portable computer, mobile device, personal digital assistant, laptop, smart phone, WAP phone, an interactive television, video display terminals, gaming consoles, and portable electronic devices or any combination of these. The components of the fleet management system 120 can be provided over a wide geographic area and connected via the network 130.

The processor of the fleet management system 120 can include any suitable processors, controllers or digital signal processors that can provide sufficient processing power depending on the configuration, purposes and requirements of the fleet management system 120. In some embodiments, the processor can include more than one processor with each processor being configured to perform different dedicated tasks.

The data storage of the fleet management system 120 can include random access memory (RAM), a read-only memory (ROM), an erasable programmable read-only memory (EPROM, EEPROM, or Flash memory), one or more hard drives, one or more flash drives or some other suitable data storage elements such as disk drives, etc. The communication component of the fleet management system 120 can include any interface that enables the fleet management system 120 to communicate with other devices and systems. In some embodiments, the communication component can include at least one of a serial port, a parallel port or a USB port. The communication component may also include at least one of an Internet, Local Area Network (LAN), Ethernet, Firewire, modem or digital subscriber line connection. Various combinations of these elements may be incorporated within the communication component. For example, the communication component may receive input from various input devices, such as a mouse, a keyboard, a touch screen, a thumbwheel, a track-pad, a track-ball, a card-reader, voice recognition software and the like depending on the requirements and implementation of the fleet management system 120.

In some embodiments, the fleet management system 120 can generate commands for the self-driving material-transport vehicles 110. For example, the fleet management system 120 can generate and transmit navigational commands to the self-driving material-transport vehicles 110. The navigational commands can direct the self-driving material-transport vehicles 110 to navigate to one or more payloads or destination locations located within the operating environment of the self-driving material-transport vehicle 110. For example, the destination locations can correspond to locations where the self-driving material-transport vehicle 110 is required to pick up or drop off a payload.

In some embodiments, the fleet management system 120 can transmit the location of a payload to the self-driving material-transport vehicle 110 and the self-driving material-transport vehicle 110 can then navigate itself to the payload. The fleet management system 120 can transmit the locations in various formats, such as, but not limited to, a set of Global Positioning System (GPS) coordinates, or coordinates defined relative to an electronic map accessible to the self-driving material-transport vehicle 110 and the fleet management system 120. The coordinates may be defined relative to an object or objects which are detectable by the self-driving material-transport vehicle 110, or a combination thereof.

The fleet management system 120 can also receive data from the self-driving material-transport vehicle 110. For example, the self-driving material-transport vehicles 110 can transmit payload characteristics as received/determined by the self-driving material-transport vehicle, such as the payload characteristics determined by a sensing system of the self-driving material-transport vehicle. The fleet management system 120 can receive the payload characteristic data, the self-driving vehicle operational conditions, the mission characteristics, and update the safety configuration database accordingly.

The fleet management system 120 can also transmit action commands to the self-driving vehicles 110. Action commands can define an action that the self-driving vehicles 110 are required to perform at a destination location, for example. An example action command can indicate that the self-driving vehicle 110*a* is to pick up a payload at a first destination location and drop off the payload at a second destination location. When the action command requires the self-driving vehicle 110*a* to pick up a payload, the fleet management system 120 can include information about the payload within the action command, such as image data or text data associated with the payload, or other characteristic information related to the payload. The image data can include an image of the payload and the text data can include payload descriptions, such as dimensions, color, size, and/or weight. The image and text data can assist the self-driving vehicles 110 with identifying the load and assist with performing the systems and methods disclosed herein.

In some embodiments, one or more commands for the self-driving vehicles 110 generated by the fleet management system 120 may be referred to as a mission or a command.

Figure 2:
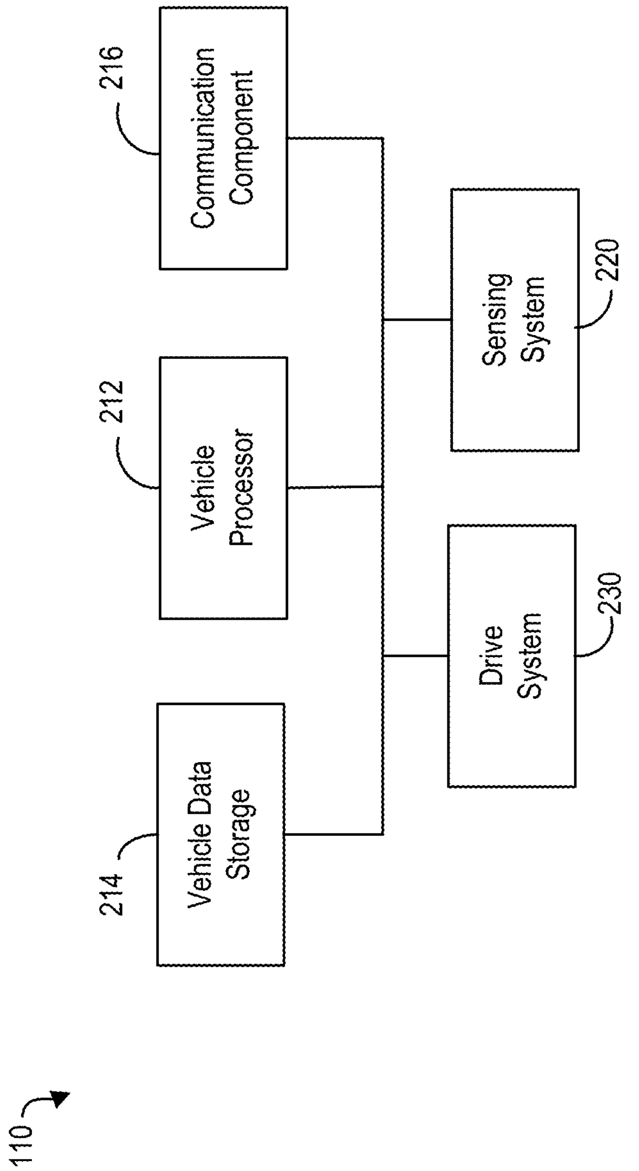
FIG. 2 is a block diagram of example components of the example self-driving material transport vehicle.

Referring now to FIG. 2, shown therein a block diagram 200 of example components of an example self-driving material-transport vehicle 110. The self-driving material-transport vehicle 110 can include a vehicle processor 212, a vehicle data storage 214, a communication component 216, a sensing system 220, and a drive system 230. Components 212, 214, 216, 220, and 230 are illustrated separately in FIG. 2. In some embodiments, one or more of the components 212, 214, 216, 220, and 230 can be combined into fewer components, or separated into further components. In some embodiments, parts of a component can be combined with another part of another component.

The vehicle processor 212 can include any suitable processor, controller or digital signal processor that can provide sufficient processing power and reliability depending on the configuration, purposes and requirements of the self-driving material-transport vehicle 110. In some embodiments, the vehicle processor 212 can include more than one processor with each processor being configured to perform different dedicated tasks.

The vehicle processor 212 can operate the vehicle data storage 214, the communication component 216, the sensing system 220, and the drive system 230. For example, the vehicle processor 212 can operate the drive system 230 to navigate to the waypoints or destination location as identified by a fleet management system, such as fleet management system 120. The vehicle processor 212 can also operate the drive system 230 to avoid collisions with objects detected in the self-driving vehicle's proximity and bring the self-driving vehicle to a stop, or rest position. The operation of the vehicle processor 212 can be based on data collected from the vehicle data storage 214, the communication component 216, the sensing system 220, and/or the drive system 230, in some embodiments.

The vehicle data storage 214 can include RAM, ROM, one or more hard drives, one or more flash drives or some other suitable data storage elements such as disk drives, etc. For example, the vehicle data storage 214 can include volatile and non-volatile memory. Non-volatile memory can store computer programs consisting of computer-executable instructions, which can be loaded into the volatile memory for execution by the vehicle processor 212. Operating the vehicle processor 212 to carry out a function can involve executing instructions (e.g., a software program) that can be stored in the vehicle data storage 214 and/or transmitting or receiving inputs and outputs via the communication component 216. The vehicle data storage 214 can also store data input to, or output from, the vehicle processor, which can result from the course of executing the computer-executable instructions for example.

In some embodiments, the vehicle data storage 214 can store data related to the operation of the self-driving material-transport vehicles 110. The vehicle data storage 214 can store data tables, data processing algorithms (e.g., image processing algorithms), as well as other data and/or operating instructions which can be used by the vehicle processor 212. In some embodiments, the vehicle data storage 214 may store initial sets of payload characteristics for recent missions or reoccurring missions with the same payloads.

The communication component 216 can include any interface that enables the self-driving material-transport vehicle 110 to communicate with other components, and external devices and systems. In some embodiments, the communication component 216 can include at least one of a serial port, a parallel port or a USB port. The communication component 216 may also include a wireless transmitter, receiver, or transceiver for communicating with a wireless communications network (e.g., using an IEEE 802.11 protocol or similar). The wireless communications network can include at least one of an Internet, Local Area Network (LAN), Ethernet, Firewire, modem or digital subscriber line connection. Various combinations of these elements may be incorporated within the communication component 216. For example, the communication component 216 may receive input from various input devices, such as a mouse, a keyboard, a touch screen, a thumbwheel, a track-pad, a track-ball, a card-reader, voice recognition software and the like depending on the requirements and implementation of the self-driving material-transport vehicle 110. For example, the communication component 216 can receive commands and/or data from the fleet management system 120 and/or another self-driving material-transport vehicle (e.g., another self-driving material-transport vehicle operating within the same operating environment).

The communication component 216 can receive information about obstacles and/or unexpected objects located in the self-driving material-transport vehicle's operating environment directly from other self-driving material-transport vehicles within the same operating environment and/or indirectly via the fleet management system 120. The vehicle processor 212 can update an electronic map stored in the vehicle data storage 214 with this information, for example. The vehicle processor 212 may also transmit, via the communication component 216 for example, information related to obstacles and/or unexpected objects identified in its operating environment to other self-driving material-transport vehicles directly or indirectly via the fleet management system 120. In some embodiments, the vehicle processor 212 may also transmit information related to other payloads associated with other self-driving material-transport vehicles in the same operating environment to other self-driving material-transport vehicles directly or indirectly via the fleet management system 120. For example, during a mission self-driving material-transport vehicle 110*a* may receive information related to the payload associated with self-driving material-transport vehicle 110*b*. Self-driving material-transport vehicle 110*a* may then transmit the information related to the payload of self-driving material-transport vehicle 110*b* directly or indirectly via the fleet management system 120.

The sensing system 220 can monitor the environment of the self-driving material-transport vehicle 110. The sensing system 220 can include one or more sensors for capturing information related to the environment. The information captured by the sensing system 220 can be applied for various purposes, such as payload detection, localization, navigation, mapping and/or collision avoidance. For example, the sensing system 220 can include optical sensors equipped with depth perception capabilities, infrared (IR) capabilities, or sonar capabilities. The optical sensors can include imaging sensors (e.g., photographic and/or video cameras), and range-finding sensors (e.g., time of flight sensors, Light Detection and Ranging (LIDAR) devices which generate and detect reflections of pulsed laser from objects proximal to the self-driving material-transport vehicle 110, etc.). The sensing system 220 can also include sensors that detect payload characteristics. Example sensors that detect payload characteristics can include, but not limited to, weight sensors, size sensors, volume sensors, pressure sensors, temperature sensors, humidity sensors, vibration sensors, motion sensors, proximity sensors, barcode or RFID scanners, optical sensors, and chemical composition sensors. The sensing system 220 can include proximity sensors that detect payloads, other self-driving vehicles, and humans, within a proximity of the self-driving material-transport vehicle.

The sensing system 220 can also monitor the operation of the self-driving material-transport vehicle 110. The sensing system 220 can include example sensors, such as encoders, arranged to measure the speed of a wheel of the self-driving material-transport vehicle 110, the traction of the self-driving material-transport vehicle 110, or the tilt angle of the self-driving material-transport vehicle 110. In some embodiments, encoders are provided for each wheel. On tricycle self-driving vehicles, encoders can measure the steering angle along with the drive velocity. The sensing system 220 can include sensors to measure the presence, the mass, or the type of a payload of the self-driving material-transport vehicle.

The sensing system 220 can monitor continuous variables and/or discrete variables. For example, continuous variables can relate to speed, velocity, acceleration, traction, steering angle, tilt angle, and/or payload mass measurements while discrete variables can relate to the presence of a payload, the type of payload, payload security status (e.g., locked or unlocked), and/or the presence of a human within a proximity of the self-driving material-transport vehicle 110.

The sensing system 220 can include one or more components that control the operation of the sensors. For example, the components can include, but is not limited to, one or more processors, programmable logic controllers (PLCs), embedded controllers, and/or relays. In some embodiments, the sensing processors can receive data collected by the sensors and process the collected data. The sensing processors can operate independently from the vehicle processor 212. In some embodiments, the sensing system 220 can receive the data collected by the sensors and transmit the collected data to the vehicle processor 212 for processing.

The drive system 230 can include the components required for steering and driving the self-driving material-transport vehicle 110. For example, the drive system 230 can include the steering component and drive motor.

Figure 3:
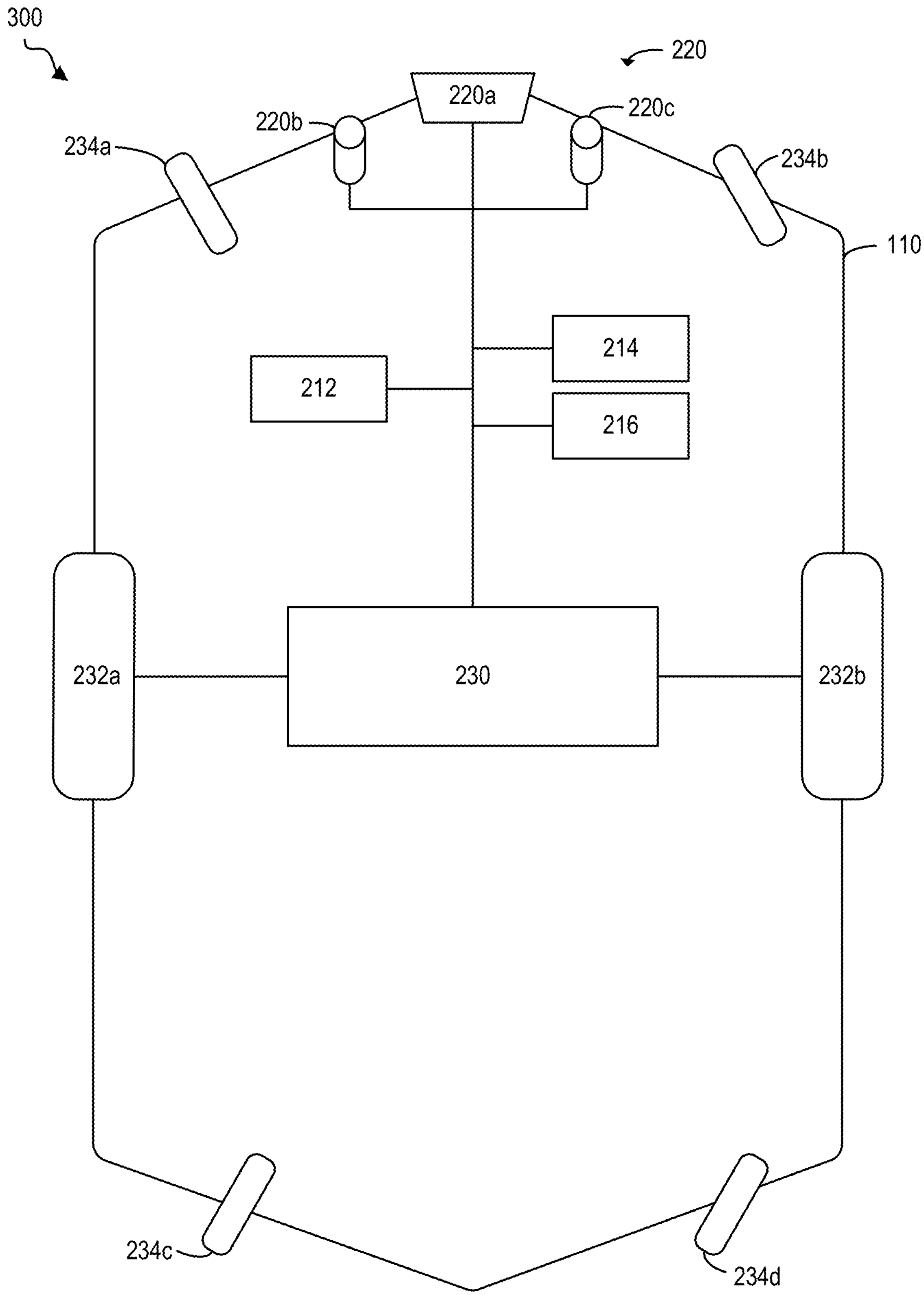
FIG. 3 is another block diagram of example components of the example self-driving material transport vehicle.

Reference will now be made to FIG. 3, which is another block diagram 300 of an example self-driving material-transport vehicle 110. The self-driving material-transport vehicle 110 shown in FIG. 3 can act as a self-driving vehicle for transporting payloads between different locations. The self-driving material-transport vehicle 110 includes the drive system 230, the sensing system 220, the vehicle processor 212, the vehicle data storage 214, and the communication component 216.

The self-driving material-transport vehicle 110 can include a cargo component for carrying loads. For example, the cargo component can be a flatbed or a bucket having sidewalls to prevent loads from falling out as the self-driving material-transport vehicle 110 moves. The self-driving material-transport vehicle 110 can include cargo securing mechanisms to secure the load and prevent the load from falling off the self-driving material-transport vehicle 110. The self-driving material-transport vehicle 110 can include flexible components, which may be removed from the self-driving material-transport vehicle 110. For example, a cargo securing mechanism may be removable when not in use.

The drive system 230 includes a motor and/or brakes connected to drive wheels 232*a* and 232*b* for driving the self-driving material-transport vehicle 110. The motor can be, but is not limited to, an electric motor, a combustion engine, or a combination/hybrid thereof. Depending on the application of the self-driving material-transport vehicle 110, the drive system 230 may also include control interfaces that can be used for controlling the drive system 230. For example, the drive system 230 may be controlled to drive the drive wheel 232*a* at a different speed than the drive wheel 232*b* to turn the self-driving material-transport vehicle 110. Different embodiments may use different numbers of drive wheels, such as two, three, four, etc.

A number of wheels 234 may be included. The self-driving material-transport vehicle 110 includes wheels 234*a*, 234*b*, 234*c*, and 234*d*. The wheels 234 may be wheels that can allow the self-driving material-transport vehicle 110 to turn, such as castors, omni-directional wheels, and mecanum wheels. In some embodiments, the self-driving material-transport vehicle 110 can be equipped with special tires for rugged surfaces or particular floor surfaces unique to its environment.

The sensing system 220 in FIG. 3 includes example sensors 220*a*, 220*b*, and 220*c*. The sensors 220*a*, 220*b*, 220*c* can include, but are not limited to, optical sensors arranged to provide three-dimensional (e.g., binocular or RGB-D) imaging, two-dimensional laser scanners, three-dimensional laser scanners, LiDAR sensors for high-resolution depth mapping and object detection, weight sensors (e.g., load cells, strain gauges), volumetric sensors (e.g., ultrasonic, capacitive, or structured light sensors), pressure sensors, RFID and barcode scanners for payload identification, infrared sensors for thermal imaging, hyperspectral or multispectral sensors for material composition analysis, and vibration sensors for payload stability assessment.

The positions of the components 234, 220, 230, 232 of the self-driving material-transport vehicle 110 is shown for illustrative purposes and are not limited to the illustrated positions. Other configurations of the components 234, 220, 230, 232 can be used depending on the application of the self-driving material-transport vehicle 110 and/or the environment in which the self-driving material-transport vehicle 110 will be used.

Figure 4A:
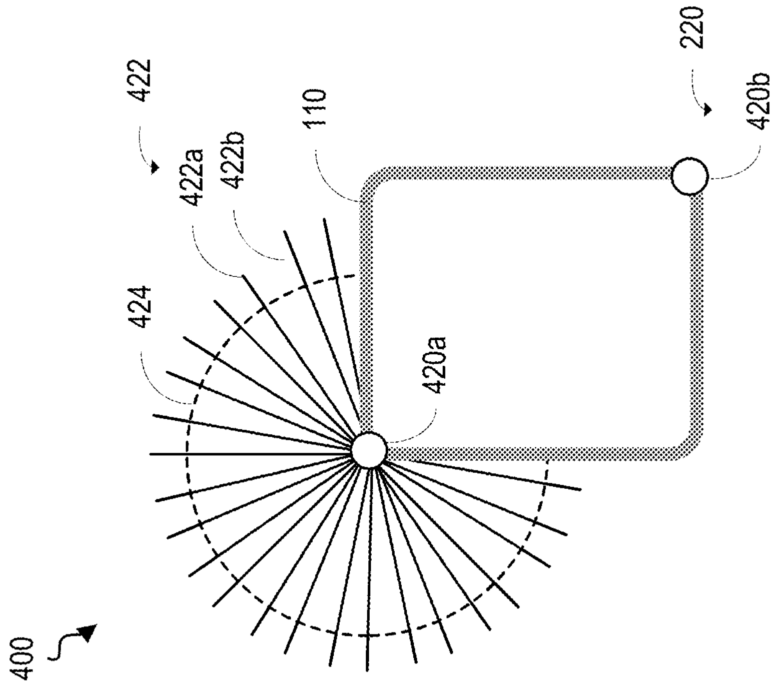
FIG. 4A is a diagram illustrating an example operation of sensors of the example self-driving material-transport vehicle.
Figure 4B:
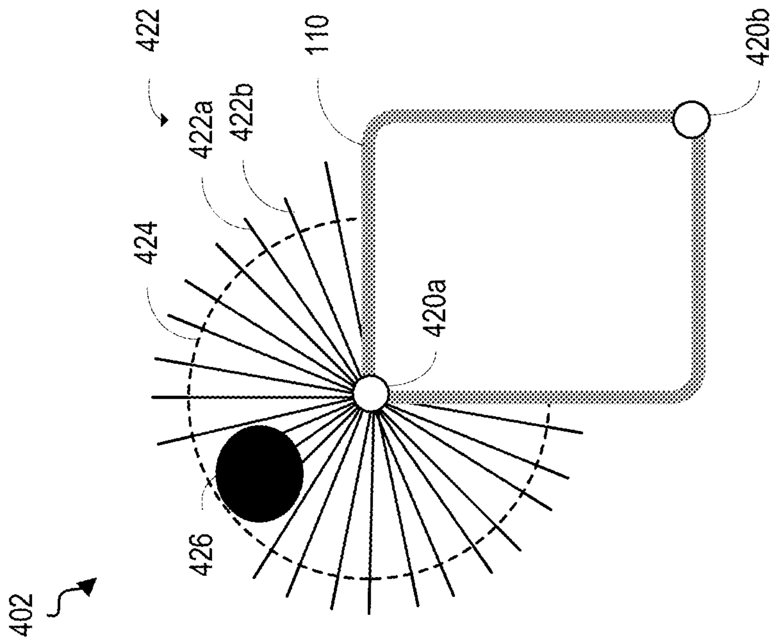
FIG. 4B is another diagram illustrating another example operation of the sensors of the example self-driving material-transport vehicle shown in FIG. 4A.

Referring now to FIGS. 4A and 4B, shown therein are diagrams 400 and 402 of example operations of a sensing system 220 of the self-driving material-transport vehicle 110.

The sensing system 220 in FIGS. 4A and 4B include example sensors 420*a* and 420*b*. Although only two sensors are shown, the self-driving material-transport vehicle 110 can include fewer or more sensors. The sensors 420*a* and 420*b* can estimate the relative range and bearing of objects, such as a payload, within a proximity of the self-driving material transport vehicle 110. For example, the sensors 420*a* and 420*b* can be, but are not limited to, Light Detection and Ranging (LiDAR) devices. LiDAR devices can operate to generate infrared pulsed laser and detect distances, such as distances 422*a* and 422*b* from a payload, such as payload 426 shown in FIG. 4B. Other sensors may include depth cameras, stereo camera pairs, and monocular cameras enabled with appropriate object detection algorithms to determine an initial set of payload characteristics. Each of the sensors 420*a*, 420*b* can detect payloads within a sensor detection region. Example sensor detection region 424 for sensor 420*a* is illustrated in FIGS. 4A and 4B.

The sensor detection regions 424 can be adjustable. Adjusting the sensor detection regions 424 can involve changing the scan rate, the angular resolution, the linear resolution, the spectrum, and/or other such properties of the sensors. For example, the vehicle processor 212 can adjust the sensor detection regions 424 by varying a range of the sensors 420*a*, 420*b*. In some embodiments, varying a range of the sensor can involve selecting between pre-defined sensor detection regions. In the example shown in FIGS. 4A and 4B, when the vehicle processor 212 adjusts the range of the sensors 420*a*, 420*b*, the range of the resulting pulsed laser would be adjusted such that the overall sensor detection region 424 would be adjusted accordingly. In some embodiments, the vehicle processor 212 can adjust the range of the sensors to change the behavior of the self-driving material-transport vehicle when a payload 426 is detected. In other embodiments, the vehicle processor 212 can adjust the range of the sensors in accordance with a safety mode to align the operation of the self-driving material-transport vehicle 110 with the detected payload.

The sensing system 220 can include multiple sensors that are in proximity to each other on the self-driving material-transport vehicle 110. The vehicle processor 212 can operate the sensing system 220 to vary the operation of each sensor. The sensing system 220 can vary the operation of each sensor differently so that the resulting sensor detection region combined from each of the sensor detection regions of each sensor form different shapes as required for adapting to the payload of the self-driving material-transport vehicle 110.

In some embodiments, the sensing system 220 can operate according to a pre-defined configuration stored in the vehicle data storage 214 that corresponds to a prior initial set of payload characteristics. For example, a given LiDAR safety field set may correspond to a prior payload with a prior initial set of payload characteristics. If the self-driving vehicle receives an initial set of payload characteristics similar to a prior set of initial payload characteristics, the vehicle processor 212 may use the pre-defined sensing system configuration stored in the vehicle data storage 214.

Figure 5:
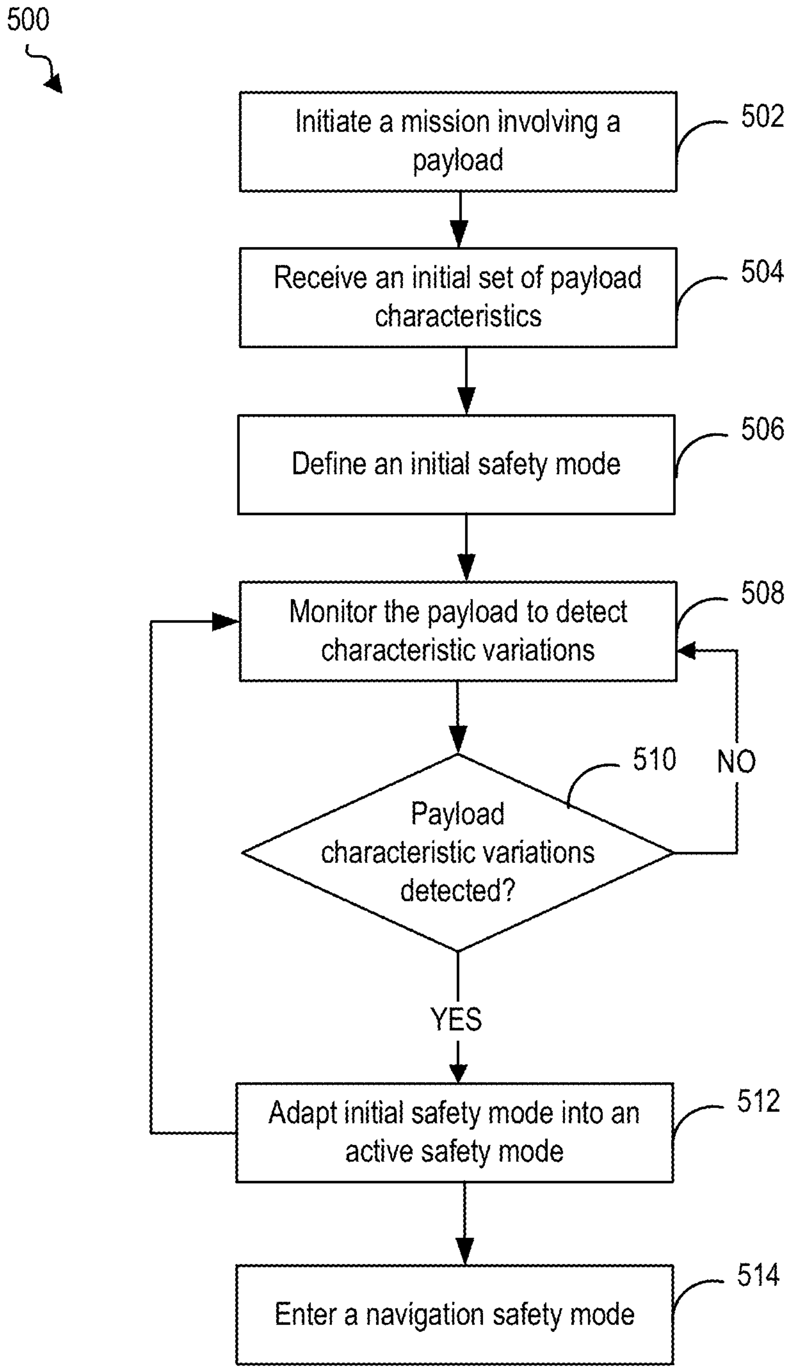
FIG. 5 is a flowchart illustrating an example method of operating the example self-driving material-transport vehicle.

Referring now to FIG. 5, which is a flowchart 500 of an example method for operating a self-driving material-transport vehicle, such as self-driving material transport vehicle 110, under various safety modes determined autonomously based at least on one or more payload characteristics. To assist with the description of FIG. 5, reference will be made simultaneously to FIGS. 6, 7, 8, 9, 10, and 11.

At 502, the vehicle processor 212 can operate the self-driving material-transport vehicle 110 to initiate a mission involving a payload. In some embodiments, the vehicle processor 212 can obtain the mission involving the payload from the fleet management system 120 over the network 130. For example, with reference to FIG. 6, at 610, the self-driving material-transport vehicle 110 initiates a mission involving a payload (e.g., 650). The vehicle processor 212 can also obtain the mission involving the payload from the system data storage 140 and/or the vehicle data storage 214.

The mission can involve the autonomous execution of a predefined transport task, which includes picking up and dropping off a payload at designated locations. The mission may begin with the self-driving material-transport vehicle 110 navigating to the location of the payload using onboard sensors and mapping data. Upon arrival, the self-driving vehicle can engage its sensing system 220 to verify the presence and characteristics of the payload, ensuring proper alignment for loading.

At 504, the vehicle processor 212 of the self-driving material transport vehicle 110 receives an initial set of payload characteristics prior to the self-driving vehicle engaging with the payload. The initial set of payload characteristics can be determined by vehicle processor 212 from sensor data received from sensing system 220, allowing the self-driving vehicle to analyze and identify initial characteristics of the payload prior to engagement. Vehicle processor 212 can receive sensor data associated with the payload from sensing system 220 and process the data to generate an initial set of payload characteristics. The initial set of payload characteristics can include structural properties such as size (e.g., length, width, and height), shape (e.g., irregular, cylindrical, and rectangular), and mass and centre of mass estimation, as well as material composition to distinguish between different types of payloads, or any other physical characteristics of the payload that may affect the transportation of the payload or the operation of the self-driving material-transport vehicle with the payload. The initial set of payload characteristics may include environmental factors such as temperature and potential hazardous elements present in the payload. In some embodiments, the initial set of payload characteristics is determined using a combination of cameras, depth sensors, LiDARs, optical scanners, RFID scanners, thermal imaging, gas sensors, or any other sensors included in the vehicle sensing system 220.

In some embodiments, the payload can be equipped with an indicium, such as an RFID tag, QR code, barcode, or other scannable marker, which can be detected and analyzed by sensing system 220. By identifying an indicium on the payload, vehicle processor 212 may directly retrieve the initial payload characteristics instead of processing raw sensor data to generate them. This approach reduces the need for real-time analysis, thereby minimizing computational load and improving processing efficiency. In some embodiments, the indicium may provide only a general classification of the payload, such as its type or category, rather than detailed characteristics. In such cases, vehicle processor 212 can cross-reference the identified payload type with a payload database containing known initial payload characteristics. This lookup process allows the self-driving material transport vehicle 110 to quickly obtain relevant information such as size, shape, weight, material composition, and handling requirements, for example.

In some embodiments, the vehicle processor 212 can obtain the initial set of payload characteristics from fleet management system 120. For example, when self-driving material-transport vehicle 110 receives a mission involving a specific payload, the mission data may include predefined payload characteristics such as dimensions (length, width, height), weight, content type, weight distribution, center of mass, or other characteristics associated with the payload. The vehicle processor 212 may analyze a portion, or all, of the sensor data received from sensing system 220 to validate that the initial payload characteristics received from the fleet management system 120 correspond to the actual payload prior to the self-driving material-transport vehicle 110 engaging with the payload. In a further embodiment, the self-driving material-transport vehicle may not verify the initial payload characteristics using the sensor data from the sensing system 220 and rely on the initial characteristics received from the fleet management system 120.

Figure 6:
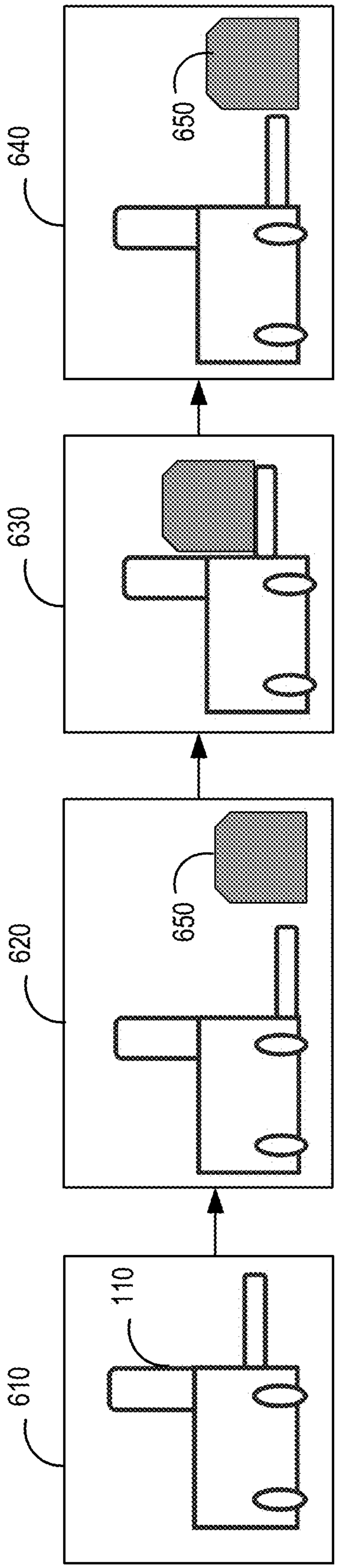
FIG. 6 is a diagram illustrating the example method of operating the example self-driving material-transport vehicle of FIG. 5.

With reference to FIG. 6, at 610 the self-driving material-transport vehicle 110 operates to initiate a mission involving a payload, where the initial payload characteristics of the payload involved in the mission may be known or unknown. The self-driving vehicle may proceed to the location of the payload involved with the mission and at 620, prior to engaging with the payload 650, the self-driving material-transport vehicle 110 can assess the payload using sensing system 220, to receive the initial set of payload characteristics for the payload 650.

At 506, the vehicle processor 212 can define an initial safety mode based at least on the initial set of payload characteristics for initiating the engagement with the payload. For any given set of payload characteristics there can be a corresponding safety mode. For example, the initial set of payload characteristics will define an initial safety mode based on the initial set of payload characteristics. The initial safety mode may include operational considerations such as linear velocity, angular velocity, braking distance, and safety field sets. Once the initial payload characteristics have been received and the initial safety mode has been defined, the self-driving material-transport vehicle can initiate the initial safety mode when approaching the payload for engagement.

In some embodiments, the vehicle processor 212 can determine from a safety configuration database, a prior mission involving a prior payload associated with a set of prior payload characteristics. The prior payload characteristics can be substantially similar to the initial set of payload characteristics associated with the payload of the current mission. The vehicle processor 212 can define the initial safety mode based on prior mission characteristics associated with the prior mission. For example, vehicle processor 212 may determine the initial set of payload characteristics for the given payload is wide (e.g., 6 meters) and heavy (e.g., 1500 kg). The initial payload characteristics may be substantially similar to an initial set of payload characteristics associated with a prior mission/payload. The initial safety mode of the current payload can be based on the prior mission characteristics associated with the prior mission.

For example, the prior payload may have had an initial set of characteristics including a width of 5.8 meters and a weight of 1600 kg. The prior mission characteristics associated with the prior payload may have included dynamic limits such as an acceleration of 1 $m/s^2$, a top speed of 1.75 m/s, and a turning rate of 0.5 rad/s, additionally the LiDAR may have operated with a safety field set such as the field sets illustrated in FIGS. 7A and 7B. Since the payload involved in a prior mission had a substantially similar set of payload characteristics to the initial set of payload characteristics, the initial safety mode of the current payload can be defined based on the prior mission characteristics associated with the prior mission. For example, the initial safety mode may include dynamic limits such as an acceleration of 1 $m/s^2$, a top speed of 1.75 m/s, and a turning rate of 0.5 rad/s, additionally the LiDAR may operate with a safety field set such as the field sets illustrated in FIGS. 7A and 7B.

In some embodiments, the initial safety mode for initiating engagement with the payload can include defining an initial operation configuration for the self-driving material-transport vehicle based on the initial set of payload characteristics and one or more mission characteristics of the mission. The initial operation configuration can include vehicle dynamic limits appropriate for the payload based on the initial set of payload characteristics and the environment the self-driving material-transport vehicle is operating in. Vehicle processor 212 can assign the initial operation configuration to the self-driving material-transport vehicle while operating in the initial safety mode. Mission characteristics may include the environment the mission is performed in, the duration of the mission, the mission path, indoor or outdoor operation, payload pickup location, payload drop off location, presence of humans, the number of other self-driving vehicles involved in the mission, ambient temperature, regulatory compliance, battery life, energy efficiency, and any other characteristics that may be associated with the mission. Vehicle dynamic limits may include the acceleration and deceleration profiles, top speed, turning rates, LiDAR safety fields, emergency stop distance, center of mass shift, wheel slip and skid limits, gradeability, and moment of inertia.

For each payload and its assigned mission, an initial operation configuration for the self-driving material-transport vehicle is defined. The initial operation configuration includes vehicle dynamic limits appropriate for the payload based on the initial set of payload characteristics and the environment of the self-driving material-transport vehicle. For example, given the initial set of payload characteristics and the environment of the self-driving vehicle, a corresponding initial operation configuration can be determined. The environment of the self-driving vehicle may correspond to a warehouse where no humans are allowed to enter, and the initial set of payload characteristics may include a payload that has a heavy weight (e.g., 2000 kg) and is long in shape (e.g., 8 meters). Different environments may influence the appropriate vehicle dynamic limits for the self-driving vehicle. For instance, an environment where it is known that no humans will be present may result in different vehicle dynamic limits, such as operating at higher speeds and a smaller LiDAR safety field set footprint. In comparison to an environment where humans are present, which may require the self-driving vehicle to operate at lower speeds to account for the safety of the personnel in the area and a larger LiDAR safety field set.

The initial characteristics of the payload can be included to define the initial operation configuration of the self-driving material-transport vehicle. Any set of initial characteristics determined for the initial set of characteristics for the payload can be used to define the operational configuration for the self-driving material-transport vehicle. For example, a payload that is determined to be long (e.g., 8 meters) and heavy (e.g., 2000 kg) may include vehicle dynamic limits that are appropriate for the payload based on the initial set of payload characteristics. For a long, heavy payload, the vehicle dynamic limits may include an acceleration of 0.75 $m/s^2$, a top speed of 1.4 m/s, and a turning rate of 0.5 rad/s.

In another example, for an initial set of payload characteristics where the payload is determined to be tall with a low center of gravity, the vehicle dynamic limits may include an acceleration of 0.5 $m/s^2$, a top speed of 1.2 m/s, and a turning rate of 0.25 rad/s. In another example, for an initial set of payload characteristics where the payload is determined to be wide and have a heavy mass, the vehicle dynamic limits may include an acceleration of 1 $m/s^2$, a top speed of 1.75 m/s, and a turning rate of 0.5 rad/s.

Figure 7B:
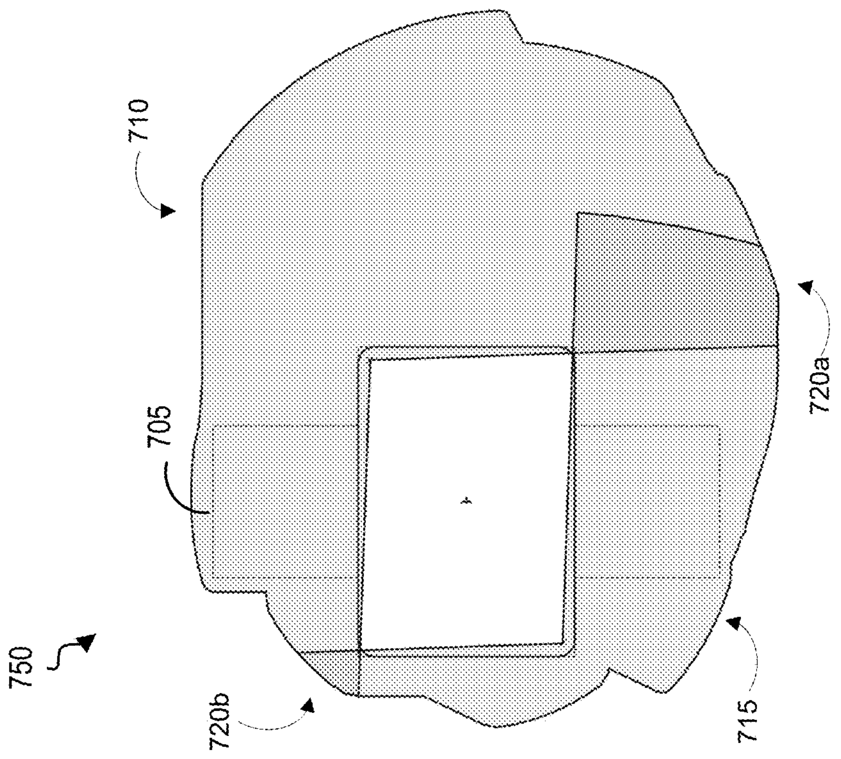
FIG. 7B is a diagram of an example sensor region for an example self-driving material-transport vehicle carrying a wide medium-weight payload when turning.
Figure 7A:
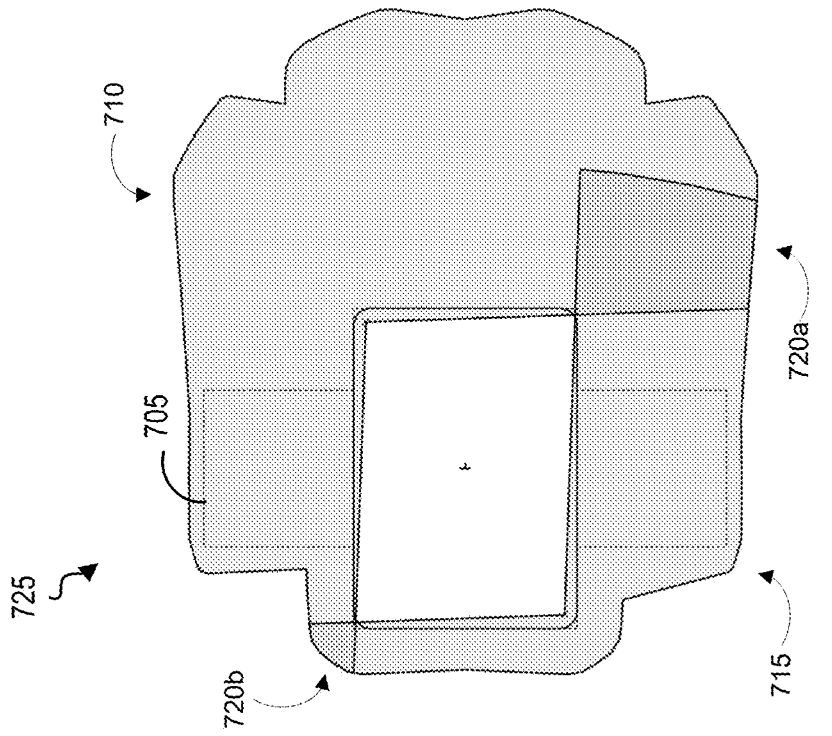
FIG. 7A is a diagram of an example sensor region for an example self-driving material-transport vehicle carrying a wide medium-weight payload when travelling in a straight line.

Additionally, LiDAR safety fields can be adjusted to account for the different sets of initial payload characteristics as different payloads can require a different level of safety for operation. FIGS. 7A and 7B are examples of safety LiDAR field set footprints 725, 750 for a wide payload 705 with a medium mass. In each of the examples, the self-driving vehicle is carrying a wide payload 705 with a LIDAR origin at a corner of the self-driving vehicle. Reference number 710 of FIGS. 7A and 7B denotes the front LiDAR safety field and reference number 715 denotes the rear LiDAR safety field. Reference numbers 720*a*, 720*b* denote the sections where the safety field sets 710 and 715 overlap. FIG. 7A illustrates the safety LiDAR field set for the wide payload with a medium mass when it is operating in a straight-line motion. FIG. 7B illustrates the safety LiDAR field set for the wide payload with a medium mass when it is operating in an arching motion, such as turning.

Figure 8A:
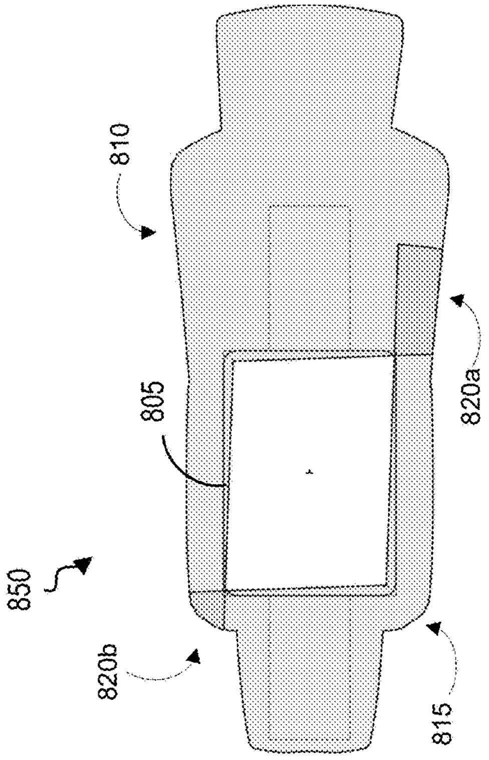
FIG. 8A is a diagram of an example sensor region for an example self-driving material-transport vehicle carrying a long medium-weight payload when travelling in a straight line.
Figure 8B:
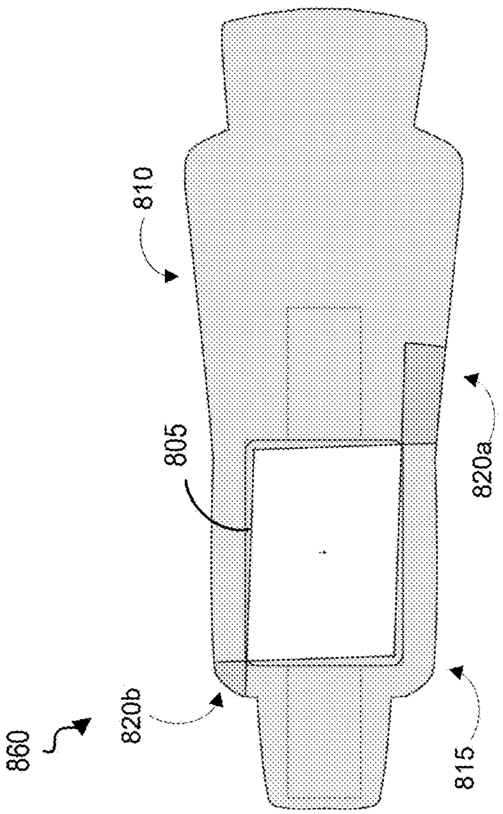
FIG. 8B is a diagram of an example sensor region for an example self-driving material-transport vehicle carrying a long heavy-weight payload when travelling in a straight line.
Figure 8C:
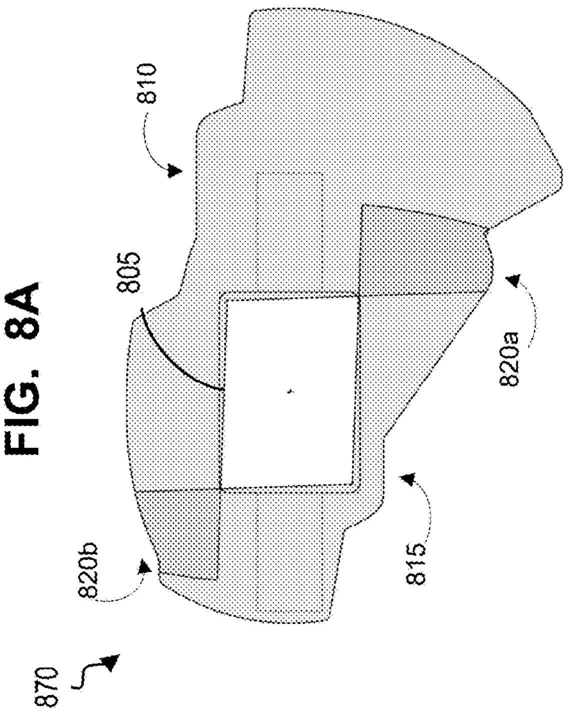
FIG. 8C is a diagram of an example sensor region for an example self-driving material-transport vehicle carrying a long medium-weight payload when turning.
Figure 8D:
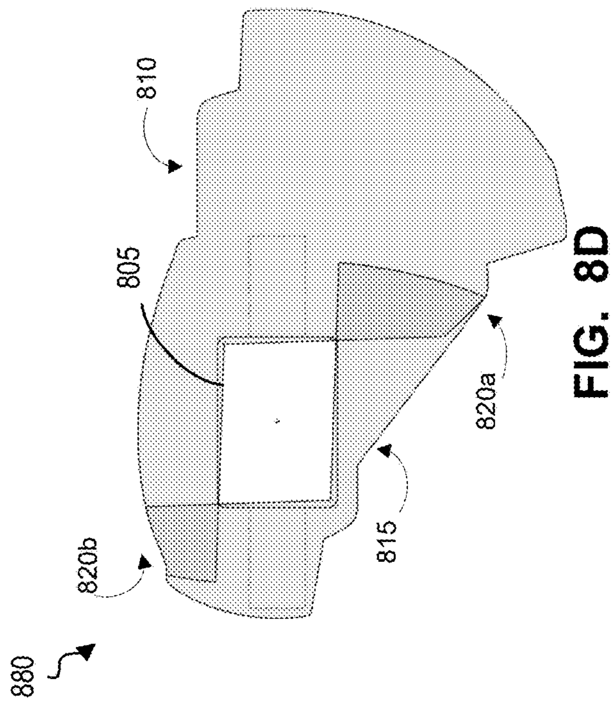
FIG. 8D is a diagram of an example sensor region for an example self-driving material-transport vehicle carrying a long heavy-weight payload when turning.

Similarly, FIGS. 8A, 8B, 8C, and 8D are examples of safety LiDAR field set footprints 850, 860, 870, 880 for a long payload 805 with a medium mass. In each of the examples, the self-driving vehicle is carrying a long payload 805 with a LIDAR origin at a corner of the self-driving vehicle. Reference number 810 denotes the front LiDAR safety field and reference number 815 denotes the rear LiDAR safety field. Reference numbers 820*a*, 820*b* denote the sections where the safety field sets 810 and 815 overlap. FIG. 8A illustrates the safety LiDAR field set for the long payload 805 with a medium mass when it is operating in a straight-line motion. FIG. 8C illustrates the safety LiDAR field set for the long payload 805 with a medium mass when it is operating in an arching motion, such as turning. FIGS. 8B and 8D are further examples of safety LiDAR field set footprints for a long payload 805 with a heavy mass.

Figure 9A:
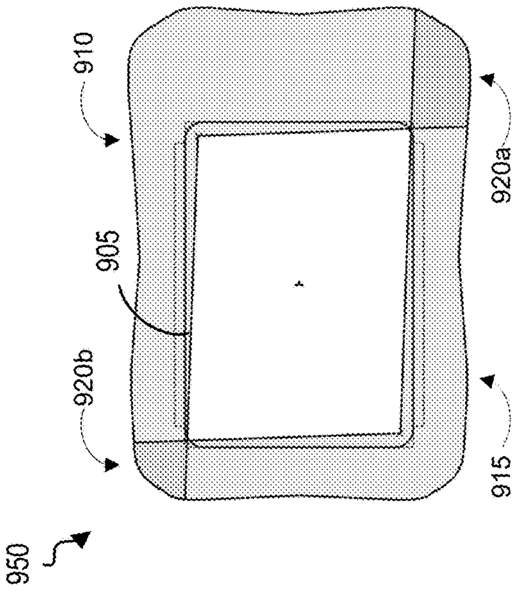
FIG. 9A is a diagram of an example sensor region for an example self-driving material-transport vehicle carrying a small light-weight payload when travelling in a straight line.
Figure 9B:
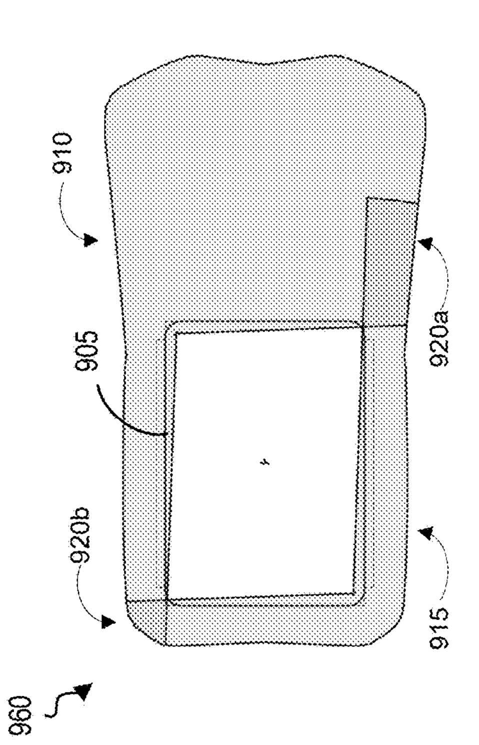
FIG. 9B is a diagram of an example sensor region for an example self-driving material-transport vehicle carrying a small medium-weight payload when travelling in a straight line.
Figure 9C:
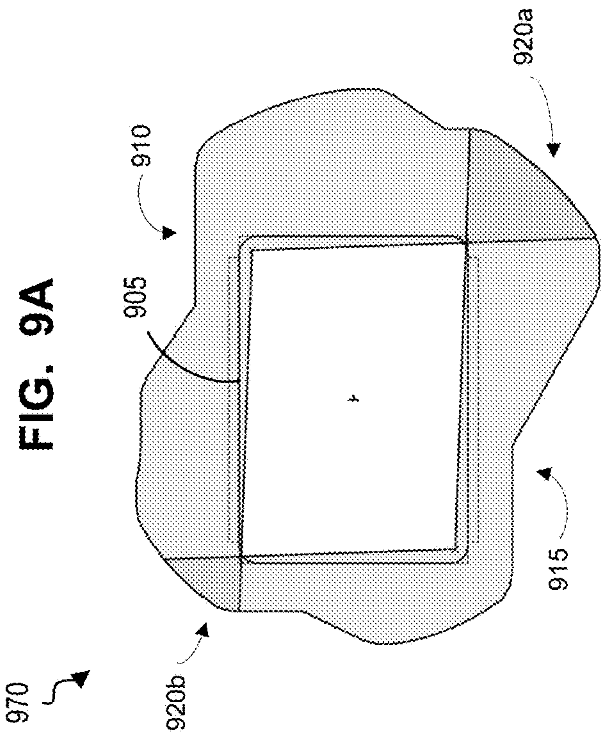
FIG. 9D is a diagram of an example sensor region for an example self-driving material-transport vehicle carrying a small medium-weight payload when turning.
Figure 9D:
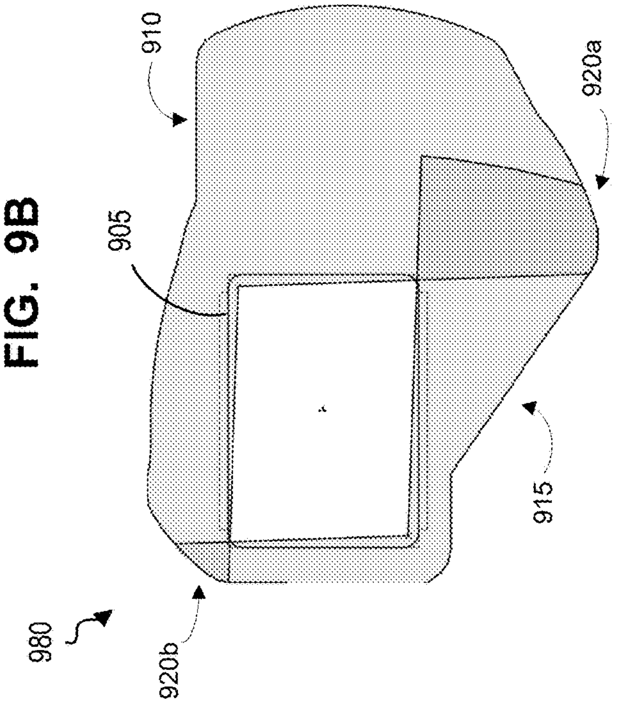

FIGS. 9A, 9B, 9C, and 9D, similarly show examples of LiDAR field set footprints 950, 960, 970, 980 for a small sized payload 905. In each of the examples, the self-driving vehicle is carrying a small payload 905 with a LIDAR origin at a corner of the self-driving vehicle. Reference number 910 denotes the front LiDAR safety field and reference number 915 denotes the rear LiDAR safety field. Reference numbers 920*a*, 920*b* denote the sections where the safety field sets 910 and 915 overlap. FIG. 9A illustrates the safety LiDAR field set for a small-sized payload 905 with a low mass when it is operating in a straight-line motion. FIG. 8C illustrates the safety LiDAR field set for small-sized payload 905 with a low mass when it is operating in an arching motion, such as turning. FIGS. 9B and 9D are examples of safety LiDAR field set footprints for a small-sized payload with a medium mass.

Considering both the initial set of payload characteristics and one or more mission characteristics of the mission, the initial operation configuration can be determined for the self-driving material-transport vehicle. The initial operation configuration can include the vehicle dynamic limits appropriate for the payload based on the initial set of payload characteristics and the environment of the self-driving material-transport vehicle. The initial operation configuration can be assigned to the self-driving material-transport vehicle while the self-driving vehicle is operating in the initial safety mode.

At 508, while the self-driving material-transport vehicle 110 is engaged with the payload, the vehicle processor 212 monitors the payload to detect one or more characteristic variations from the initial set of payload characteristics. As illustrated in FIG. 6 at 630, the self-driving vehicle will continue to monitor the payload to detect any characteristic variations from the initial set of payload characteristics. For example, characteristic variations may include a change in weight, a change in weight distribution, the contents of the payload, the behaviour of the payload on the self-driving vehicle, dynamic feedback from the self-driving vehicle such as accelerations, power consumption, and any other performance indicators or characteristics of the payload that could not be determined by the self-driving vehicle prior to the self-driving vehicle engaging with the payload. The self-driving vehicle may be equipped with a weight sensor to allow for the detection of a weight characteristic variation. For example, prior to engagement, the initial set of payload characteristics may have included that the payload was heavy (e.g., 1500 kg). However, once the self-driving vehicle is engaged with the payload, using the weight sensor, it may be determined that there is a characteristic variation and the weight of the payload is a medium-weight payload (e.g., 800 kg.). In another embodiment, the self-driving vehicle may have a plurality of sensors to detect the weight distribution of the payload and detect any characteristic variations in the weight distribution once engaged with the self-driving vehicle.

In some embodiments, the monitoring of the payload to detect the one or more characteristic variations from the initial set of payload characteristics can include inducing movement at the payload for analyzing a load characteristic of the payload. From analyzing the load characteristic of the payload, the vehicle processor 212 can determine whether there are any characteristic variations from the analysis of the load characteristic of the payload. The induced movement of the payload can allow the vehicle processor 212 to determine characteristics of the payload. Comparing the characteristics of the payload with the initial set of characteristics of the payload enables the vehicle processor 212 to determine any characteristic variations. For example, inducing movement of the payload when the payload is engaged with the self-driving material-transport vehicle can allow for the weight distribution of the payload to be analyzed or the contents of the payload to be determined. By inducing movement, the response may allow the vehicle processor 212 to detect that the contents of the payload are broken glass, which may require adapting the initial safety mode of the self-driving material transport vehicle as discussed at 512.

In some embodiments, the monitoring of the payload to detect the one or more characteristic variations from the initial set of payload characteristics can include monitoring an operation response at the self-driving material-transport vehicle when engaged with the payload. In response to the vehicle processor 212 detecting an unexpected operation response, the vehicle processor 212 can determine the one or more characteristics variations based on the unexpected operation response. The unexpected operation response can be detected when the operation response varies from an expected behaviour under the initial safety mode. For example, if prior to engagement the initial set of payload characteristics included the payload being lightweight and small-sized, the self-driving vehicle is likely to accelerate, decelerate, and turn quickly, since there is minimal impact on its inertia and center of mass. The self-driving vehicle may operate closer to its top speed and have a more responsive navigation behavior, allowing for smoother and more efficient path adjustments. However, if the self-driving vehicle is not accelerating and turning quickly, the monitored operational response of the self-driving material-transport vehicle is that of an unexpected operation response. Based on the operational response of the self-driving vehicle, the vehicle processor 212 may determine the one or more characteristic variations based on the unexpected operation response.

At 510, the vehicle processor 212 determines whether a characteristic variation was detected from the initial set of payload characteristics. For example, while the self-driving vehicle is operating, the payload may shift locations on the self-driving vehicle affecting the mass distribution which can be a characteristic variation of the payload based on the initial set of payload characteristics. If the vehicle processor 212 determines one or more characteristic variations from the initial set of payload characteristics while monitoring the payload at 508, then the vehicle processor 212 can proceed to 512. However, if no characteristic variation from the initial set of payload characteristics is detected, the vehicle processor 212 can return to 508 to continue monitoring the payload for the duration of the mission to detect one or more characteristic variations from the initial set of payload characteristics.

At 512, the vehicle processor 212 automatically adapts the initial safety mode into an active safety mode. The active safety mode can be defined based at least on the one or more characteristic variations to align an operation of the self-driving material-transport vehicle with the payload.

In some embodiments, automatically adapting the initial safety mode into the active safety mode includes the vehicle processor 212 generating an active operation configuration to account for the one or more characteristic variations such that the vehicle dynamic limits under the active operation configuration are appropriate for the actual payload characteristics detected when engaged with the payload. The vehicle processor 212 can assign the active operation configuration to the self-driving material-transport vehicle during operation. For example, in the active safety mode, any of the vehicle dynamic limits such as speed, acceleration, braking distance, or turning radius may be adapted in accordance with the one or more characteristic variations determined for the payload.

Figure 10B:
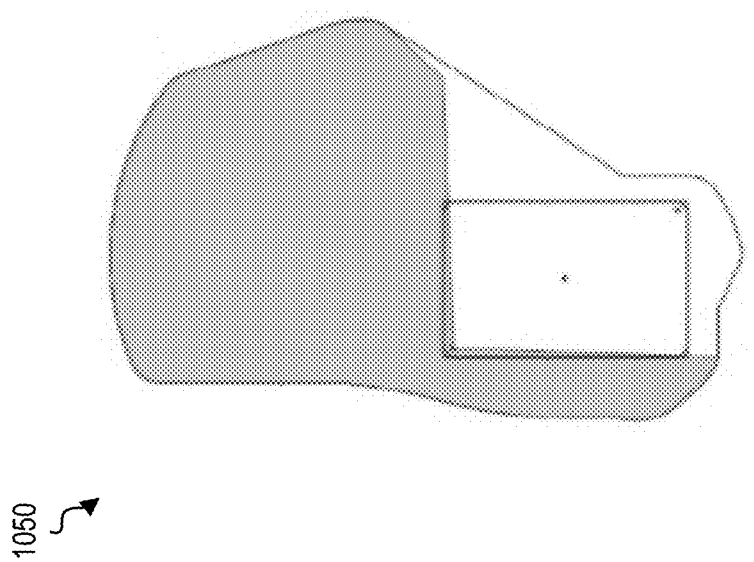
FIG. 10B is a diagram of an example LiDAR safety field for the example payload of FIG. 10A.
Figure 10A:
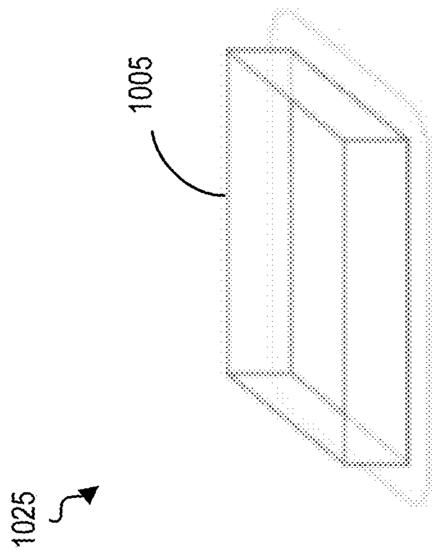
FIG. 10A is a diagram of an example payload footprint.
Figure 11B:
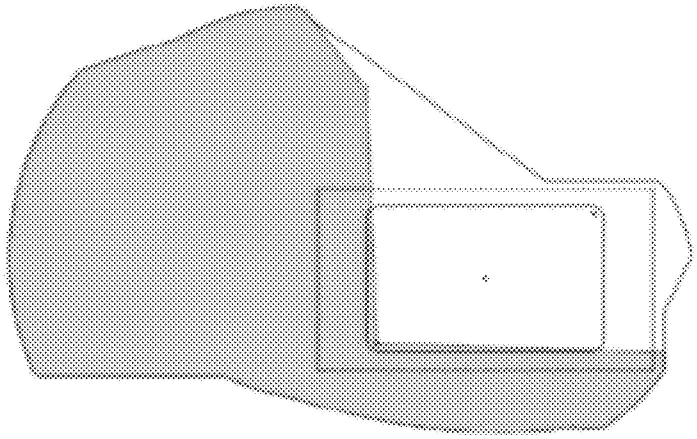
FIG. 11B is a diagram of an example LiDAR safety field for the example payload of FIG. 11A.
Figure 11A:
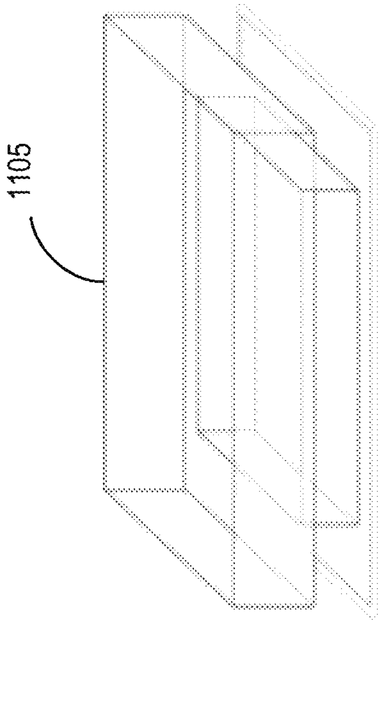
FIG. 11A is diagram of another example payload footprint.

With reference to FIG. 10A, a payload 1005 is shown on a base of a self-driving vehicle. FIG. 10B illustrates the initial safety mode field set footprint 1050 that corresponds to an appropriate safety mode for the payload 1005. While the payload is being monitored, the vehicle processor 212 may determine that there are one or more characteristic variations associated with the payload 1005. As illustrated in FIG. 11A, the payload 1105 on the base of the self-driving vehicle may be wider, taller, and heavier than the initial set of payload characteristics determined initially for payload 1005. Accordingly, as illustrated in FIG. 11B, the field set footprint 1150 may be adapted to account for the payload characteristic variations. In addition to adapting the safety field set footprint, the self-driving vehicle may adapt other vehicle dynamic limits such as the acceleration, speed, braking distance, and turning radius to account for the payload characteristic variations.

In some embodiments, the vehicle processor 212 continuously monitors the payload to detect the one or more characteristic variations while operating in the active safety mode. During a single mission one or more characteristic variations may be detected at separate instances resulting in multiple adaptions to the safety mode. For example, after the initial safety mode has been defined for the initial set of payload characteristics, a first characteristic variation is detected which results in the adaption of the initial safety mode into a first active safety mode. Later, a second characteristic variation is detected which results in the adaptation of the first active safety mode into a second active safety mode.

In some embodiments, the self-driving vehicle may operate without an active safety mode. For example, if no characteristic variations are detected by the vehicle processor 212 during the mission, then the self-driving vehicle will remain in operation in its initial safety mode until the payload has been dropped off at its drop off location and the absence of a payload has been detected.

At 514, the vehicle processor 212 operates the self-driving material-transport vehicle to enter a basic safety mode upon the detection of an absence of the payload from the self-driving material-transport vehicle. The basic safety mode may also be referred to as the no payload safety mode. Typically, when the self-driving vehicle has completed its mission, the payload will be removed from the self-driving vehicle and dropped off at its drop-off location. Meaning the self-driving vehicle will no longer be engaged with the payload, as illustrated in FIG. 6 at 640, which shows the payload 650 dropped off at a drop off location. If the vehicle processor 212 has detected the absence of the payload, the absence of the payload may mark the completion of the mission for the self-driving material-transport vehicle. The vehicle processor 212 can have the self-driving material-transport vehicle enter the basic safety mode upon completing the mission involving the payload. The detected absence of the payload by vehicle processor 212 can have the self-driving vehicle operating in the basic safety mode.

In some embodiments, the vehicle data storage 214 may store at least two safety modes for a given set of payload characteristics. The at least two safety modes may include a basic or default safety mode, an initial safety mode, and an active safety mode. The basic safety mode may be used when the self-driving vehicle is operating in the absence of a payload. The initial safety mode and active safety modes may be used when the self-driving vehicle is engaged with a payload, depending on the payload characteristics and characteristic variations determined during the mission as described above. The active safety mode may be continuously updated by the vehicle processor 212 during a mission involving a payload and stored in the vehicle data storage 214 or sent over the network to the system data storage 140 or fleet management system 120.

The embodiments described herein relate to methods, along with associated systems configured to execute these methods, of operating a self-driving material-transport vehicle under various safety modes determined autonomously based at least on one or more payload characteristics. With the disclosed self-driving material-transport vehicle system herein, various safety modes can be determined autonomously based at least on one or more payload characteristics.

It will be appreciated that numerous specific details are set forth in order to provide a thorough understanding of the example embodiments described herein. It will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high-level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

The invention claimed is:

1. A method of operating a self-driving material-transport vehicle under a plurality of safety modes determined autonomously based at least on one or more payload characteristics, the method comprising:

operating the self-driving material-transport vehicle to initiate a mission involving a payload;

receiving an initial set of payload characteristics prior to engaging the payload by the self-driving material-transport vehicle;

defining an initial safety mode based at least on the initial set of payload characteristics for initiating engagement with the payload;

while engaged with the payload, monitoring the payload to detect one or more characteristic variations from the initial set of payload characteristics;

in response to determining the one or more characteristic variations from the initial set of payload characteristics, automatically adapting the initial safety mode into an active safety mode defined based at least on the one or more characteristic variations to align an operation of the self-driving material-transport vehicle with the payload; and operating the self-driving material-transport vehicle to enter a basic safety mode upon detection of an absence of the payload from the self-driving material-transport vehicle.

2. The method of claim 1, wherein defining the initial safety mode based at least on the initial set of payload characteristics for initiating engagement with the payload comprises:

entering the initial safety mode at the self-driving material-transport vehicle when approaching the payload for engagement.

3. The method of claim 1, wherein defining the initial safety mode based at least on the initial set of payload characteristics for initiating engagement with the payload comprises:

determining, from a safety configuration database, a prior mission involving a prior payload associated with a set of prior payload characteristics substantially similar to the initial set of payload characteristics; and defining the initial safety mode based on a prior mission characteristics associated with the prior mission.

4. The method of claim 1, wherein defining the initial safety mode based at least on the initial set of payload characteristics for initiating engagement with the payload comprises:

defining an initial operation configuration for the self-driving material-transport vehicle based on the initial set of payload characteristics and one or more mission characteristics of the mission, the initial operation configuration comprising vehicle dynamic limits appropriate for the payload based on the initial set of payload characteristics and an environment of the self-driving material-transport vehicle; and assigning the initial operation configuration to the self-driving material-transport vehicle while operating in the initial safety mode.

5. The method of claim 1, wherein in response to determining the one or more characteristic variations from the initial set of payload characteristics, automatically adapting the initial safety mode into the active safety mode comprises:

generating an active operation configuration to account for the one or more characteristic variations such that vehicle dynamic limits under the active operation configuration are appropriate for actual payload characteristics detected when engaged with the payload; and assigning the active operation configuration to the self-driving material-transport vehicle during operation.

6. The method of claim 1, further comprises continuously monitoring the payload to detect the one or more characteristic variations while operating in the active safety mode.

7. The method of claim 1, wherein monitoring the payload to detect the one or more characteristic variations from the initial set of payload characteristics comprises:

inducing movement at the payload for analyzing a load characteristic of the payload; and determining whether there are any characteristic variations from the analysis of the load characteristic.

8. The method of claim 1, wherein monitoring the payload to detect the one or more characteristic variations from the initial set of payload characteristics comprises:

monitoring an operation response at the self-driving material-transport vehicle when engaged with the payload; and in response to detecting an unexpected operation response when the operation response varies from an expected behaviour under the initial safety mode, determining the one or more characteristics variations based on the unexpected operation response.

9. The method of claim 1, wherein receiving the initial set of payload characteristics prior to engaging the payload by the self-driving material-transport vehicle comprises:

receiving sensor data associated with the payload; and analyzing the sensor data to generate the initial set of payload characteristics for the payload.

10. The method of claim 1, wherein operating the self-driving material-transport vehicle to enter the basic safety mode upon detection of the absence of the payload from the self-driving material-transport vehicle comprises:

entering the basic safety mode upon completing the mission involving the payload.

11. A system of operating a self-driving material-transport vehicle under a plurality of safety modes determined autonomously based at least on one or more payload characteristics, the system comprising a processor operable to:

operate the self-driving material-transport vehicle to initiate a mission involving a payload;

receive an initial set of payload characteristics prior to engaging the payload by the self-driving material-transport vehicle;

define an initial safety mode based at least on the initial set of payload characteristics for initiating engagement with the payload;

while engaged with the payload, monitor the payload to detect one or more characteristic variations from the initial set of payload characteristics;

in response to determining the one or more characteristic variations from the initial set of payload characteristics, automatically adapt the initial safety mode into an active safety mode defined based at least on the one or more characteristic variations to align an operation of the self-driving material-transport vehicle with the payload; and operate the self-driving material-transport vehicle to enter a basic safety mode upon detection of an absence of the payload from the self-driving material-transport vehicle.

12. The system of claim 11, wherein the processor is operable to:

enter the initial safety mode at the self-driving material-transport vehicle when approaching the payload for engagement.

13. The system of claim 11, wherein the processor is operable to:

determine, from a safety configuration database, a prior mission involving a prior payload associated with a set of prior payload characteristics substantially similar to the initial set of payload characteristics; and define the initial safety mode based on a prior mission characteristics associated with the prior mission.

14. The system of claim 11, wherein the processor is operable to:

define an initial operation configuration for the self-driving material-transport vehicle based on the initial set of payload characteristics and one or more mission characteristics of the mission, the initial operation configuration comprising vehicle dynamic limits appropriate for the payload based on the initial set of payload characteristics and an environment of the self-driving material-transport vehicle; and assign the initial operation configuration to the self-driving material-transport vehicle while operating in the initial safety mode.

15. The system of claim 11, wherein the processor is operable to:

generate an active operation configuration to account for the one or more characteristic variations such that vehicle dynamic limits under the active operation configuration are appropriate for actual payload characteristics detected when engaged with the payload; and assign the active operation configuration to the self-driving material-transport vehicle during operation.

16. The system of claim 11, wherein the processor is operable to continuously monitor the payload to detect the one or more characteristic variations while operating in the active safety mode.

17. The system of claim 11, wherein the processor is operable to:

induce movement at the payload for analyzing a load characteristic of the payload; and determine whether there are any characteristic variations from the analysis of the load characteristic.

18. The system of claim 11, wherein the processor is operable to:

monitor an operation response at the self-driving material-transport vehicle when engaged with the payload; and in response to detecting an unexpected operation response when the operation response varies from an expected behaviour under the initial safety mode, determine the one or more characteristics variations based on the unexpected operation response.

19. The system of claim 11, wherein the processor is operable to:

receive sensor data associated with the payload; and analyze the sensor data to generate the initial set of payload characteristics for the payload.

20. The system of claim 11, wherein the processor is operable to enter the basic safety mode upon completing the mission involving the payload.

* * * * *